Nov. 21, 1950     R. H. MEADOR, JR     2,531,341
FRICTION MECHANISM WITH CLEARANCE ADJUSTER

Filed April 16, 1946     2 Sheets-Sheet 1

Inventor
Robert H. Meador, Jr.
By R. H. Waters
Attorney

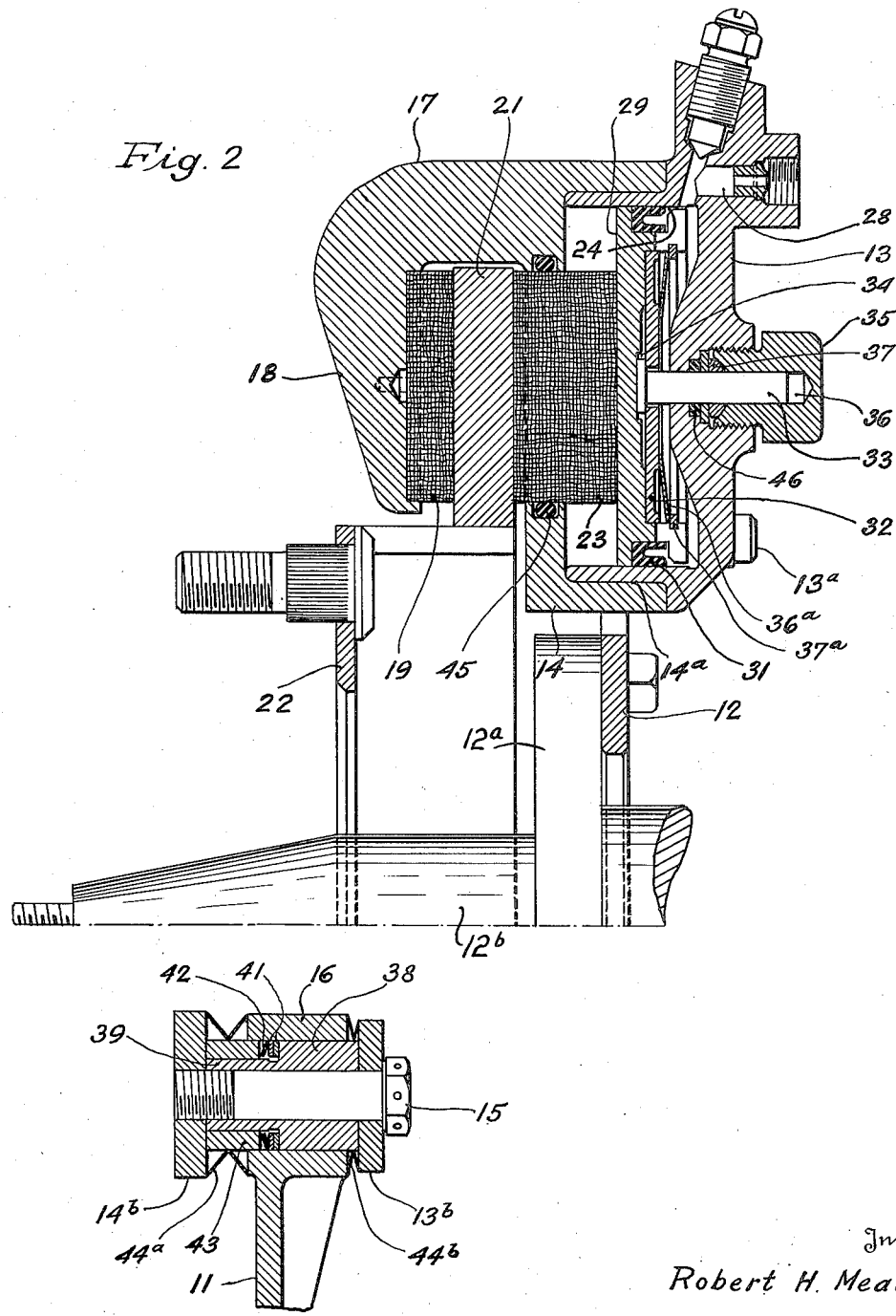

Patented Nov. 21, 1950

2,531,341

UNITED STATES PATENT OFFICE 2,531,341

FRICTION MECHANISM WITH CLEARANCE ADJUSTER

Robert H. Meador, Jr., Akron, Ohio, assignor to Wingfoot Corporation, Akron, Ohio, a corporation of Delaware Application April 16, 1946, Serial No. 662,502

9 Claims. (Cl. 188—72)

1

This invention relates to the combination of friction means engageable between relatively movable members, and especially to means for automatically compensating for brake wear, as well as for aiding in brake release.

In all braking structures there are at least two major problems presented. One of these is to retain the brake in operable condition with substantially the same braking stroke even after appreciable wear has occurred, and, second, there is the problem of effecting a complete and immediate brake release when desired.

The general object of this invention is to overcome the foregoing problems in a brake construction and provide an improved, sturdy, positive acting brake release and compensator device.

Another object of the invention is to provide a simply constructed, automatic brake release.

A further object of the invention is to provide a brake compensator device that automatically is moved to a continued brake operative position, as brake wear occurs.

Another object of the invention is to provide an effective, positive acting, dependable, brake release and compensator device that is capable of long service without repair or manual adjustment, and which functions to provide proper clearance between the braking material and braking surface, such as a disc, on both sides of the disc.

The foregoing objects of the invention, and other objects which will become apparent as the description proceeds, are achieved by providing in combination, relatively movable members, one of the members hav'ng opposed friction surfaces, friction material units, means for operating the friction material units to frictionally engage the units with the opposed friction surfaces, mechanism supporting the operating means of the member not having the friction surfaces, said mechanism including resilient means for establishing clearance between one friction material unit and its associated friction surface when the operating means are not operated, said mechanism also including resilient pressed-fit parts allowing repositioning of the operating means relative to the member having opposed friction surfaces when wear of said one friction material unit requires it, said operating means including resilient means for establishing clearance between the second frict'on material unit and its associated friction surface when the operating means are not operated, and said operating means also including resilient

2 pressed-fit parts allowing repositioning of the second friction material unit when wear thereof requires it.

For a better understanding of the invention, reference should be had to the accompanying drawings, wherein:

Fig. 2 is a section taken on line II—II of Fig. 1; and

Fig. 3 is a section taken on line III—III of Fig. 1.

Figure 1:
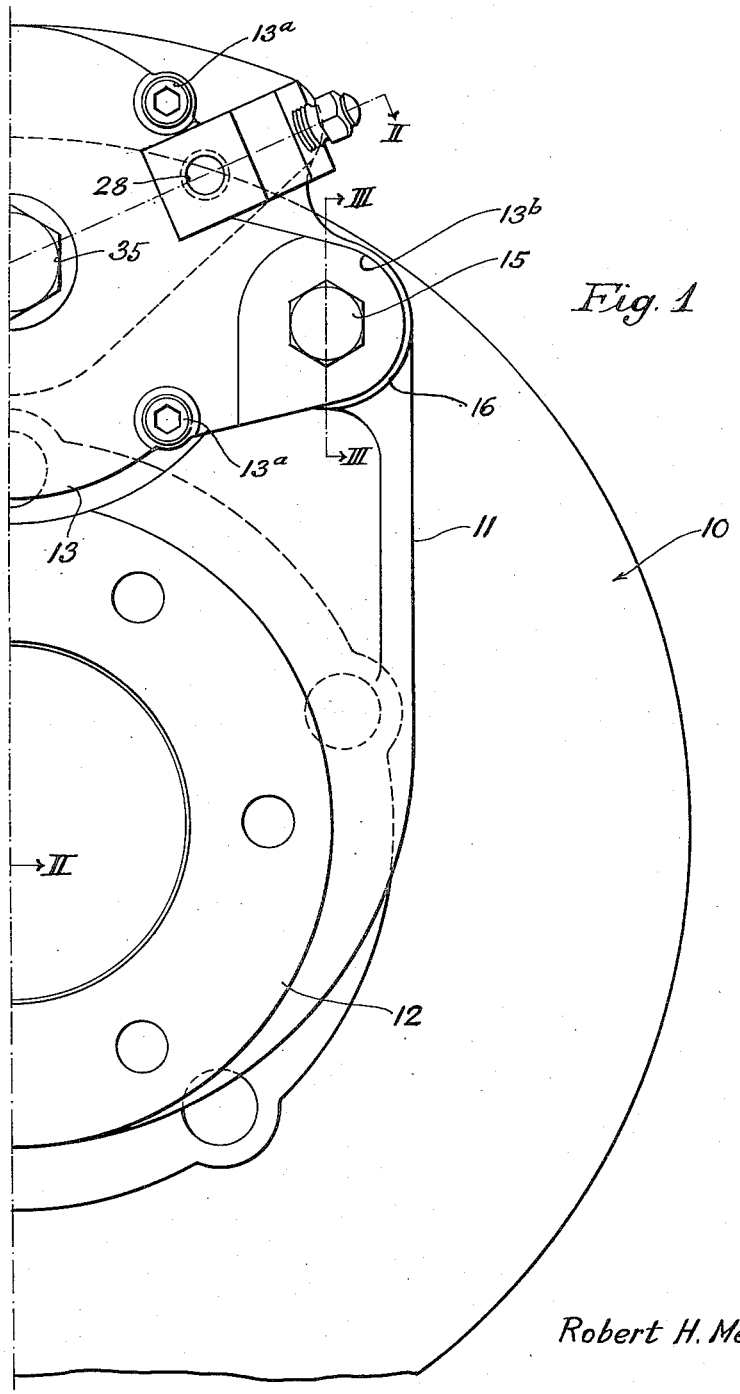
Fig. 1 is a fragmentary elevation of a brake embodying the principles of my invention.

Referring specifically to the drawing, there is shown a spot type brake 10 which is carried on a flange arm 11 formed as a substantially radially-directed extension of a circular ring 12 adapted to be secured to a flange 12$^a$ of wheel axle 12$^b$. The brake 10 includes a housing cylinder comprising members 13 and 14 having relatively telescopic parts 14$^a$. The members 13 and 14 are releasably secured together by cap screws 13$^a$ spaced c'rcumferentially around the members, and each member is formed with ears 13$^b$ and 14$^b$ which extend towards the flange arm 11. The ears 13$^b$ and 14$^b$ are secured together by a bolt 15 that extends through a hollow boss 16 formed on the outer end of the flange arm 11. The member 13 is formed with a bore or chamber 24 which is adapted to slidably receive piston means 29 for brake actuation. The member 14 has an overhanging L-shaped flange 17 formed on its upper edge. The flange 17 has a depending leg 18 thereon which is formed with a bore adapted to receive and suitably position a brake block of friction material thereon. The block 19 is adapted to engage with the outer surface of a fixed disc 21 secured to a flange 22, which is secured to and rotatable with a wheel (not shown). A brake block 23 of fr'ction material is slidably positioned in the member 14 for brake action on the inner surface of the disc 21.

The brake action means associated with the member 13 may be of any desired construction and, in the example shown, includes suitable condu!t means (not shown) that connect to a passage 28 leading to the chamber 24 so that hydraulic fluid may be supplied thereto for brake operation. The piston 29 with a flexible seal ring 31 received in a recess formed in its wall is positioned in the chamber 24 for reciprocal movement and a portion of the piston head is preferably secured to the brake block 23 to control its position. Thus, fluid forced into the chamber 24 behind or to the right of the piston 29 as the parts are shown, causes the piston to move to the left to bring the block 23 into engagement with a surface of the disc 21 for braking action, as such disc is retained in a fixed position.

Means for retracting the brake block 23 from operative position in engagement with the disc 21 are provided in association with the inner or right-hand surface of the piston 29. Thus, a disc 32 is slidably received in a recess in the side of the piston 29 remote from the block 23 and a headed pin 33 extends therethrough and seats in a recess 34 formed in the piston. The shank of the pin 33 extends through the member 13 and is sealed thereto by a cap nut 35 which engages with the member and has a recess 36 into which the pin 33 extends. A deformable ring 37 is received on the pin 33 and is compressed tightly against the pin by the nut 35. This effects a locking action so that the pin 33 normally is fixed with relation to the member 13. However, sufficient force can be applied to the pin 33 to move it axially, as will hereinafter be more fully explained. A belleville spring 36$^a$ bears on the disc 32 and is supported on a split lock ring 37$^a$ that snaps into a groove in the wall of the piston 29, as best shown in Fig. 2.

It will be seen that movement of the piston 29 towards the disc 21 by admission of fluid pressure to the chamber 24 will compress the spring 36$^a$ since it is retained in fixed position by the disc 32 and pin 33. After brake release, the spring 36$^a$ will move back to its normal position and thus withdraw the block 23 from contact with the wheel disc 21 so as to place this block in its non-operative, or running position.

When normal movement of the piston 29 as controlled by the pin and belleville spring doesn't permit braking action due to wear of the brake block 23, the hydraulic pressure in the chamber 24 then is entirely carried by the pin 33. Such pressure is sufficient to slide the pin 33, axially with relation to the locking ring 37, towards the disc 21 so that a new stationary position for the pin 33 is obtained and braking action results.

The construction heretofore described is, in general, known in the art, except for the means securing the members 13 and 14 on the boss 16, and it is the combination therewith of the apparatus hereinafter described that provides the present invention, which also relates specifically to the following apparatus when taken alone. In mounting the members 13 and 14 on the boss 16, a sleeve 38, having a reduced diameter end section 39, is slidably positioned in and protrudes from the boss 16 so that the ears 13$^b$ and 14$^b$ of the members 13 and 14 are separated thereby. The members 13 and 14, sleeve 38 and bolt 15 form a unit which is adapted for limited movement relative to the axle housing on brake application. To this end, one or more rings 41 are compressed and positioned in the boss 16 and abut the shoulder at the end of the reduced section 39 of sleeve 38. The rings are split washer-like members having greatest radial thickness at a point remote from the split and a gradual reduction in radial thickness towards the split. This construction is such that the ring will always be circular regardless of changes in diameter, for example, as caused by squeezing the ring into a bore of smaller diameter than the expanded ring. The rings 41 are thus frictionally seated in the boss so that an appreciable force is required to slide them transversely with relation to the boss 16. The control apparatus is completed by a belleville spring 42 that is positioned between, and bears on, the outermost ring 41 and a collar 43 that is carried on the section 39 of the sleeve 38, which collar is either fixed to the section 39 or engages with the ear 14$^b$.

On brake action, as indicated before, the sleeve 38 and unit secured thereto is moved inwardly of the wheel to the right of Figs. 2 and 3 in order to bring the brake block 19 into contact with the disc 21. It will be understood that applying pressure to the chamber 24 behind the piston 29 not only moves the piston towards one side of the disc 21 but also moves the leg 18 and block 19 towards the other side of the disc. Such movement of the member 13—14 relative to the axle flattens the belleville spring 42 and this acts on brake pressure release to return to its normal condition and thereby move the members 13 and 14 and the block 19 to non-operative position.

After brake wear, and as heretofore described, the hydraulic pressure in the chamber 24 first may be required to push the pin 33 out axially so as to permit further axially outward movement of the block 23 so as to again bring it into braking relation with the inner surface of the disc 21. In all events, when the brake block 23 is in braking association with the disc 21, the block 19 may not be in contact with the outer surface of the disc with the limited movement normally provided for the block 19 by flattening of the spring 42. Then, the pressure in the chamber 24 acts upon the member 13, sleeve 38, member 14, and collar 43 to slide the rings 41 transversely of the boss until the block 19 bears on the associated surface of the disc 21. On brake release, the rings 41 are retained in their new positions and the belleville spring 42 moves the member 14 and brake block 19 to non-operative position. Then on continued brake release, the belleville springs 36$^a$ and 42 function to withdraw, automatically, the brake blocks from the disc 21. It is to be noted that the movement of the spring 36$^a$ is approximately twice that of the spring 42 because it must move the block 23 to compensate for the movement of the spring 42 but also to establish its own clearance. As wear occurs, the movement cycle of the pin 33 or the rings 41, or both, will again be automatically performed by the apparatus of the invention.

Fig. 3 indicates that the brake plate unit initially is positioned at its transversely outermost position so that it can move inwardly with brake wear. Also, it is not essential that the blocks 19 and 23 of friction material be secured to the leg 18 and piston 29 respectively, they merely can be held in recesses.

Boots 44$^a$ and 44$^b$ of suitable construction may be secured between the boss 16 and the ears 13$^b$ and 14$^b$ to bridge the space therebetween and prevent entry of foreign material.

Suitable sealing rings 45 and 46 may be associated with the brake block 23 and the pin 33 to prevent dirt entry and fluid leak, respectively.

From the foregoing, it is seen that a sturdy, dependable, self-adjusting, positive-acting brake compensator and release device is provided by the invention. The device is able to function for appreciable periods with no manual adjustment or repair.

Although the principles of the invention have been described in conjunction with a so-called "spot type" brake, to which the principles are particularly applicable, and to brakes in general, nevertheless the invention can be employed with relatively movable or rotatable members, such as clutches. A "spot-type" brake may be defined as a brake in which braking pressures are applied between a rotary member and a stationary member in arcuately short areas or spots rather than over the majority of the area or substantially the entire area of a brake disc or drum simultaneously, as is the case in the better known band or expanding shoes types of brakes.

While in accordance with the patent statutes, one embodiment of the invention has been specifically illustrated and described, it should be clearly understood that the scope of the invention is not limited thereto, or thereby, but is defined in the appended claims.

I claim:

1. In apparatus for mounting a spot type brake on a hollow boss formed on a flange adapted to be secured to an axle housing, inner and outer brake plate members, a sleeve having a reduced outside diameter for a length at one end thereof, said sleeve being positioned in and protruding from the boss on the flange for sliding movement therein, means securing said inner and outer brake plate members and said sleeve together to form a unit, a collar secured to the reduced diameter section of said sleeve and extending into said boss, a plurality of annular members positioned on the reduced diameter section of said sleeve at the inner end thereof and in tight friction contact with the bore of the boss, and a belleville spring confined between the inner end of said collar and the end member of said annular members, said belleville spring being flattened by movement of the unit made up of said sleeve and brake plate members on brake application and being adapted to move at least one of said plate members to a "free run" position when the brake is released.

2. In apparatus for mounting a brake on a hollow boss formed on a flange, which apparatus comprises inner and outer brake plate members, a sleeve having a reduced outside diameter for a length at one end thereof, said sleeve being positioned in and protruding from the boss on the flange for sliding movement therein, means securing said inner and outer brake plate members and said sleeve together to form a unit, means secured to the reduced diameter section of said sleeve in spaced relation to the inner end of such section, an annular member positioned on the reduced diameter section of said sleeve at the inner end thereof in tight friction contact with the bore of the boss, and a belleville spring confined between the inner end of said last named means and said annular member, said belleville spring being flattened by movement of the unit made up of said sleeve and brake plate members on brake application, and being adapted to move at least one of said plate members to a clearance when the brake is released.

3. In a brake for use with a rotary but laterally fixed wheel disc, an axle housing, separate plate means for association with opposite faces of the disc, brake means associated with one of said plate means, means securing both of said plate means to said axle housing so as to permit relative movement therebetween, means normally holding said securing means and thereby said plate means against excessive movement, and brake actuating means associated with one of said plate means, said brake means including a unit slidably positioned in the second of said plate means which also fixedly carries a second brake unit, said brake means being adapted to slide the first mentioned unit of said brake means into engagement with the wheel disc and then to slide said securing means and plate unit transversely and effect braking action by said second brake unit, said holding means being adapted to retain any position in which it is placed and being constructed and arranged to move said second brake unit to run position after brake operation.

4. In a fixed disc brake construction, a rotary but axially fixed disc, brake means on opposite sides of the disc and movable against the disc on brake application, the combination of means for positively moving brake means from one side of said disc on brake release, means for positively moving brake means from the other side of said disc on brake release, both of said means being adjustable to take and retain new positions as brake wear occurs, and means for moving said first two mentioned means to new positions as brake wear occurs.

5. In combination, relatively movable members, one of the members having opposed friction surfaces, friction material units, means for operating the friction material units to frictionally engage the units with the opposed friction surfaces, mechanism supporting the operating means on the member not having the friction surfaces, said mechanism including resilient means for establishing clearance between one friction material unit and its associated friction surface when the operating means are not operated, said mechanism also including resilient pressed-fit parts allowing repositioning of the operating means relative to the member having opposed friction surfaces when wear of said one friction material unit requires it, said operating means including resilient means for establishing clearance between the second friction material unit and its associated friction surface when the operating means are not operated, and said operating means also including resilient pressed-fit parts allowing repositioning of the second friction material unit when wear thereof requires it.

6. In combination, a rotary disc, a spot-type brake having a C-frame surrounding an arcuate portion of the periphery of the disc, a support adapted to be secured to an axle, an arm secured to the brake and slidably carried on the support for movement in a direction parallel to the axis of the disc, resilient means positioned between the support and the arm to move one side of the brake away from the disc, friction means supporting the resilient means and adapted to be automatically repositioned upon excessive lining wear, said brake including a hydraulic pressure unit having a piston movable towards the disc, resilient means for moving the piston away from the disc, friction means supporting said last-named resilient means and adapted to be automatically repositioned on excessive lining wear, said last-named resilient means having substantially twice the movement of the first-named resilient means.

7. In combination, a rotary disc, a spot-type brake having a C-frame surrounding an arcuate portion of the periphery of the disc, a support adapted to be secured to an axle, an arm secured to the brake and slidably carried on the support for movement in a direction parallel to the axis of the disc, resilient means positioned between the support and the arm to move one side of the brake away from the disc, and friction means supporting the resilient means and adapted to be automatically repositioned upon excessive lining wear, said support including a hollow boss, said arm including a pin sliding inside the boss, said resilient means being carried between and operative between the pin and boss, and said friction means engaging the inside of the boss and acting as a support for one end of the resilient means.

8. In combination, a rotary disc, a spot-type brake having a C-frame surrounding an arcuate portion of the periphery of the disc, a support adapted to be secured to an axle, an arm secured to the brake and slidably carried on the support for movement in a direction parallel to the axis of the disc, resilient means positioned between the support and the arm to move one side of the brake away from the disc, and friction means supporting the resilient means and adapted to be automatically repositioned upon excessive lining wear.

9. In combination, a rotary but axially fixed disc, a spot type brake having a C-frame surrounding an arcuate portion of the periphery of the disc, a pair of blocks of friction material in the brake and each block being adapted to engage with one side of the disc, resilient means for re-establishing running clearance between one block and the disc upon release of braking action, and a separate resilient means for re-establishing running clearance between the other block and the disc upon brake release, one of the resilient means moving its block approximately twice as far as the other.

ROBERT H. MEADOR, Jr.

REFERENCES CITED

The following references are of record in the file of this patent:

UNITED STATES PATENTS

| Number | Name | Date |
|---|---|---|
| 2,349,132 | Baird | May 16, 1944 |
| 2,351,041 | Hawley | June 13, 1944 |
| 2,392,970 | Bricker | Jan. 15, 1946 |